Figure 1:
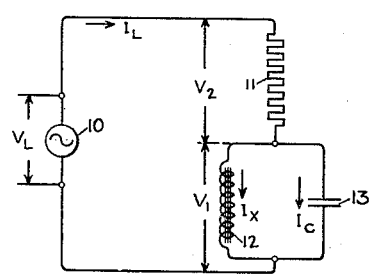

May 12, 1936.                    C. M. SUMMERS                    2,040,763
                          ELECTRIC CIRCUIT CONTROL MEANS
                              Filed Dec. 23, 1932                 2 Sheets-Sheet 1

Inventor:
Claude M. Summers,
by *Chas. W. Nellen*
His Attorney.

May 12, 1936.                C. M. SUMMERS                2,040,763
                      ELECTRIC CIRCUIT CONTROL MEANS
              Filed Dec. 23, 1932                 2 Sheets-Sheet 2

Inventor:
Claude M. Summers,
by Charles E. Tullar
His Attorney.

Patented May 12, 1936

2,040,763

UNITED STATES PATENT OFFICE

2,040,763

ELECTRIC CIRCUIT CONTROL MEANS

Claude M. Summers, Fort Wayne, Ind., assignor to General Electric Company, a corporation of New York Application December 23, 1932, Serial No. 648,629

27 Claims. (Cl. 171—119)

My invention relates to electric circuit control means and more particularly to electric circuit control means including circuit elements having non-linear volt-ampere characteristics.

It has been known for some time that certain unusual phenomena occur in circuits employing a capacitance in combination with an inductance having an iron core which is adapted to saturate magnetically. Circuits of this type are with few exceptions distinguished by non-linear volt-ampere characteristics and are used in carrying out my invention. Throughout the description and claims "non-linear" element, or circuit, will be used to designate an element, branch circuit, or circuit having a non-linear volt-ampere characteristic for effective values of alternating current.

If a circuit comprising a series connected resistance, capacitance and saturable inductance is properly dimensioned it will be observed that for a gradually increasing voltage of constant frequency, the effective current is not proportional to the voltage but increases critically at a certain voltage. Similarly, for a gradually decreasing voltage at constant frequency the effective current decreases critically at a certain voltage which may or may not be the same critical voltage depending upon the relative characteristics of the circuit elements. When the capacitance and saturable inductance are connected in parallel relation it has been found that in general the properties of the circuit are somewhat similar to those of the series circuit except that the functions of current and voltage are reversed.

The characteristics of the parallel type of non-linear circuit which have been observed and utilized heretofore have involved only stable phenomena in which the current is a continuous function of the voltage. In accordance with my invention parallel types of non-linear circuits are described which exhibit the novel phenomenon of instability in which a current of the non-linear circuit is a discontinuous function of a voltage thereof similar to the series type of non-linear circuit and are employed in applications to electric circuit control and regulation.

It is an object of my invention to provide an improved combination of circuit elements having a total non-linear volt-ampere characteristic exhibiting new and novel phenomena.

It is another object of my invention to provide a parallel type of non-linear circuit which exhibits the phenomenon of instability applicable for use in electric circuit control and regulation.

It is a further object of my invention to provide an improved combination of a capacitance and a non-linear inductance element exhibiting new and novel phenomena applicable for use in phase shifting circuits, energy conversion and circuit control means.

My invention will be better understood from the following description taken in connection with the accompanying drawings and its scope will be pointed out in the appended claims.

Figure 2:
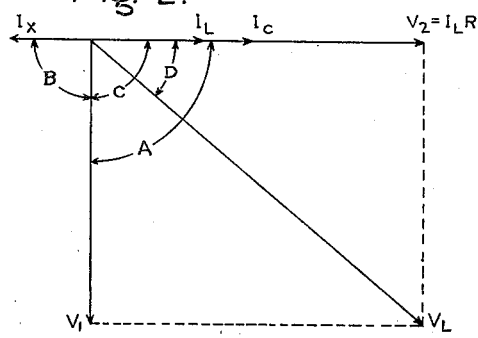

In the drawings, Fig. 1 is an elementary diagram of a parallel type of non-linear circuit for more clearly explaining my invention; Fig. 2 is a vector diagram for explaining the general principles of operation of the circuit shown in Fig. 1; Figs. 3 to 9 and Figs. 11 and 13 are diagrams illustrating different characteristics of the parallel-type of non-linear circuit illustrated in Fig. 1 for explaining the novel phenomenon of instability of this circuit utilized in carrying out my invention, and Figs. 10, 12, and 14 to 18 are diagrammatic representations of different embodiments of my invention.

Referring to Fig. 1 of the drawings, 10 indicates a source of alternating current which is connected to energize a parallel-type of non-linear circuit comprising a linear or non-linear impedance 11, shown as a resistance, and connected in series relation with a parallel type non-linear branch circuit comprising an inductance 12 and a linear capacitance 13 connected in parallel relation. The non-linear inductance 12 is designed to have a definite and predetermined saturation curve, the shape of which depends upon the total volt-ampere characteristics desired. The shape of the saturation curve can be controlled by saturation, by an air gap or by a combination of the two. The volt-ampere characteristic of capacitance 13 is a straight line, or a linear characteristic, throughout its range of operation. This general type of circuit has been previously used because of its constant current or current limiting properties since for a properly dimensioned circuit the line current may remain substantially constant in spite of variations in line voltage.

For the purpose of briefly explaining the theory of operation of the parallel-type of non-linear circuit, particularly with relation to the unusual phenomenon of instability utilized in carrying out my invention, the following nomenclature, as applied to Fig. 1 in part, and otherwise used in the mathematical analysis will be followed throughout the description:

$V_L$—Line voltage
$V_1$—Common voltage to inductance and capacitance $V_2$—Voltage across series impedance
$I_L$—Line current
$I_x$—Inductance current
$I_c$—Capacitance current
A—Power factor angle between $I_c$ and $V_1$
B—Power factor angle between $I_x$ and $V_1$
C—Power factor angle between $I_L$ and $V_1$
D—Power factor angle between $I_L$ and $V_L$
E—Power factor angle between $I_L$ and $V_2$
R—Resistance in series with parallel branch
X—Reactance in series with parallel branch
Z—Impedance in series with parallel branch
$X_e$—Equivalent reactance of inductance in parallel with capacitance
$R_e$—Equivalent resistance of inductance and capacitance in parallel
$Z_e$—Equivalent impedance of inductance and capacitance in parallel Certain assumptions must be made for simplifying the analysis. These assumptions, while not strictly true, nevertheless can be justified to a certain extent. These assumptions are:

1. The line current $I_L$ is sinusoidal with sinusoidal line voltage.
2. The equivalent resistance $R_e$ of the capacitance and inductance branch is zero.
3. The frequency and line voltage are constant.

In Fig. 2 I have shown the vector diagram for the circuit illustrated in Fig. 1. In order to simplify the analysis the impedance 11 is assumed to be a linear resistance. Since the angles A and B are by assumption each 90 degrees, the algebraic difference between $I_c$ and $I_x$ represents the line current $I_L$. If the volt-ampere curve for the inductance 12 and capacitance 13 are plotted together without regard to phase relation they will appear as in Fig. 3 wherein curve $T_L$ represents the volt-ampere curve of the inductance 12 and $T_c$ represents the volt-ampere curve of capacitance 13.

A fundamental relation for the circuit may now be established as follows:

$$I_L = \frac{V_2}{R} = \frac{V_1}{X_e} \quad (1)$$

A saturation curve for the inductance core must be available before the conditions can be solved mathematically. Since a volt-ampere curve is proportional to the saturation curve, the former may be used advantageously as it is suitable for more direct solution. Furthermore, it becomes necessary to determine the equation of this volt-ampere curve expressing the current as a function of the voltage. An equation of the second degree is one which approximates a saturation curve very closely, and for simplicity, it is assumed that the expression in current through the inductance is:

$$I_x = V_1^2 \times 10^{-3} \quad (2)$$

Figure 3:
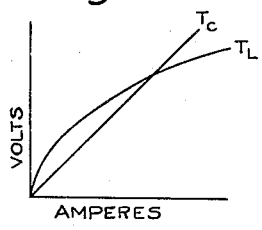

The curve $T_L$ of Fig. 3 is plotted from this equation.

A reasonable size of capacitance to be placed in parallel with this inductance is represented by Equation 3, which is also plotted as curve $T_c$ in Fig. 3.

$$I_c = V_1 \times 10^{-1} \quad (3)$$

The line current is now the algebraic difference between $I_c$ and $I_x$, thus $$I_L = I_c - I_x \quad (4)$$

Substituting for $I_c$ and $I_x$ in terms of $V_1$ $$I_L = (V_1 \times 10^{-1}) - (V_1^2 \times 10^{-3})$$

$$= \frac{V_1}{10} - \frac{V_1^2}{1000}$$

$$= \frac{100 V_1 - V_1^2}{1000} \quad (5)$$

Refer to the vector diagram Fig. 2 from which it is obvious that:

$$V_2 = \sqrt{V_L^2 - V_1^2} \quad (6)$$

From Equations (1) and (5) the expression may be written for the ohmic value of the series resistance 11 in terms of $V_L$ and $V_1$ $$R = \frac{\sqrt{V_L^2 - V_1^2} \times 1000}{100 V_1 - V_1^2} \quad (7)$$

$$\left(\frac{R}{1000}\right)^2 = \frac{V_L^2 - V_1^2}{V_1^2 (100 - V_1)^2} \quad (8)$$

The only variable in the above equation is $V_1$, therefore the left hand member of the equation may be replaced by the symbol Y. Equation (8) may be rewritten after expanding the denominator as follows:

$$Y = \frac{V_L^2 - V_1^2}{V_1^4 - 200 V_1^3 + 10000 V_1^2} \quad (9)$$

When the value of Y is a minimum, R must also be a minimum. Therefore, by taking the first derivative of Equation (9) with respect to $V_1$ and equating the results to zero, the value of $V_1$ which produces minimum and maximum values of R will be obtained. Solving for the roots of the first derivation of R with respect to $V_1$ it is found that:

$$V_1 = 0$$
$$= 100$$

and $$\frac{V_1^2}{V_1 - 50} = 2 V_L^2 \quad (10)$$

Equation (10) has three solutions for every value of line voltage. If it is assumed for instance that the line voltage is constant at 115 volts, the three values of $V_1$ are:

$$V_1 = 57$$
$$V_1 = 126.5$$

and $$V_1 = -180.5$$

There are a total of five values of $V_1$ which will either produce maximum or minimum values of resistance R. Substituting these values of $V_1$ in Equation (7) gives the following results:

| $V_1$ | Resistance R |
|---|---|
| 0 | Infinity |
| 100 | Infinity |
| 57 | 40.6 ohms |
| 126.5 | Imaginary |
| −180.5 | Imaginary |

On substituting values of voltage greater or less than 57 volts we find that in either case the resistance is greater than 40.6 ohms. Therefore, when the voltage across the inductance-capacitance unit is 57 volts the resistance in series with the unit is a minimum. When the resistance becomes less than 40.6 ohms the conditions for stability specified by Equation (1) are momentarily upset and readjustment of voltage distribution must take place. In other words, the network passes through an unstable period, which may cause a large change in voltage to take place across each element of the circuit.

Figure 4:
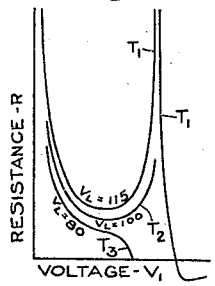

In Fig. 4, Equation (7) is plotted for three different values of line voltage with resistance R in ohms as ordinates and voltage $V_1$ across the parallel unit as abscissae. Curves $T_1$, $T_2$ and $T_3$ are plotted for 115, 100 and 80 volts, respectively. An inspection of these curves will establish a more definite picture of the unstable phenomenon. With a line voltage of 115 volts and a resistance of 40.6 ohms in series with the capacitance-inductance unit, the voltage across the latter will be 57 volts. However, if the series resistance becomes 40 ohms, the system will pass through the unstable condition and the capacitance-inductance unit will experience an immediate change in voltage from 57 volts to 108.5 volts. The voltage across the resistance will decrease from 100 volts to 38 volts with a corresponding reduction in line current.

It will be understood that the curves shown in Fig. 4 are purely mathematical curves representing Equation (7). In Fig. 3 the two volt-ampere curves intersect at a voltage $V_1$ of 100 volts for the particular circuit employed. At this point the current is zero because of the assumption that the equivalent resistance $R_e$ of the capacitor and reactor in parallel is zero. With zero current flowing in the circuit, the series impedance must be infinite for the voltage is not zero. Consequently, the curves $T_1$ of Fig. 4 go to infinity when calculated from Equation (7). After passing through infinity the curve returns very rapidly and even passes below the zero axis as shown in the drawings. In the curve marked $T_2$ where the line voltage is 100 volts the curve goes to infinity and ends there because this corresponds to the point of intersection of the volt-ampere curve and since the line voltage is not sufficient to pass this intersection the current must end at zero. With a line voltage less than 100 volts, the intersection of the volt-ampere curves is never reached; hence the current never falls to zero and the series resistance does not go to infinity.

It is to be understood that the assumption that $R_e$ is zero is never actually realized in practice and, therefore, the curves will not actually go to infinity as indicated in Fig. 4. In an actual physical circuit the current can never fall to zero even at the intersection of the volt-ampere curve and consequently the series impedance will always be a finite value and this would be indicated by the curves if the equations took into consideration the resistance of the parallel branch circuit.

Referring again to Fig. 3, another condition may be visualized. Just before the unstable period is obtained the circuit is operating at a leading power factor, because the capacitance current is greater than the inductance current. After the unstable period, however, the power factor is lagging. Thus, not only is instability associated with large and immediate changes in voltages, but the current may instantaneously change from leading to lagging. If the line voltage is not of sufficient magnitude to pass the intersection of the two volt-ampere curves the current will not become lagging. In fact, if the line voltage is below a definite value the circuit will not even become unstable.

Figure 5:
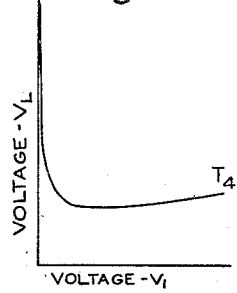

In Fig. 5 Equation (10) is plotted between line voltage $V_L$ as ordinates and capacitance-inductance unit voltage $V_1$ as abscissae. The curve $T_4$ is only plotted over a predetermined range of voltage. This curve is valuable in quickly determining the amount of series resistance necessary to cause instability to occur at any value of line voltage.

Figure 6:
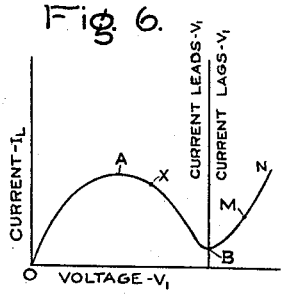
Figure 7:
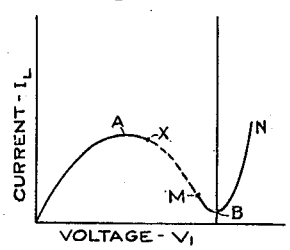
Figure 8:
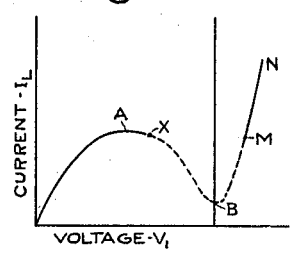

Figs. 6, 7 and 8 are volt-ampere curves plotted between the line current $I_L$ as ordinates and the voltage across the capacitance-inductance unit $V_1$ as abscissae. The dotted portions of the curves illustrated in Figs. 7 and 8 indicate possible unstable regions. These curves are used to show that the unstable phenomenon may be shifted to different sections of the volt-ampere curve depending upon the relative dimensioning of the elements of the circuit. In the early stages of my investigation it was my belief that a volt-ampere curve as in Fig. 6 would produce an unstable condition in the circuit and further that as soon as the peak in current was obtained the unstable condition would occur. On the curve of Fig. 6 the conditions just related would be as follows: the section OA would be a stable condition, section AB an unstable condition, and section BN another stable condition. Strictly speaking, this general characterization of the unstable region as invariably following within a given section of the curve is not true. I have found that the complete section from A to B may be stable, unstable, or a part of it may be stable and the remainder unstable. That is, the section OAX may be the stable condition, XBM the unstable section and section MN another stable range for increasing value of $V_1$. Furthermore, the portion of M may fall to the left of the point B as shown in Fig. 7 or to the right of point B as shown in Fig. 8. It is has also been observed that the positions of X and M may or may not coincide for both increasing and decreasing values of $V_1$.

The phenomenon of phase shift mentioned in connection with Fig. 3 is also indicated graphically in Figs. 6, 7 and 8. All values of current lying to the left of the point B lead the voltage $V_1$ because the point B represents the intersection of the volt-ampere curves shown in Fig. 3. On the other hand, all values of current lying to the right of the point B lag the voltage $V_1$ and correspond to values of line current lying above the intersection. If the point M is caused to shift along the volt-ampere curve to the right or left of the point B, not only is a large change in magnitude of $V_1$ effected but there is also a large change in phase relation between $V_1$ and $I_L$. Observations have been made where this sudden shift in phase angle amounts to as much as 135 degrees. There is of course a consequent shift in phase angle between $I_L$ and $V_L$ and also between $V_2$ and $V_L$.

If reference is again made to Equations (5) and (7) it will be observed that the line current $I_L$ with respect to the voltage $V_1$ is independent of the line voltage $V_L$, whereas the series resistance R with respect to the voltage $V_1$ is dependent upon line voltage $V_L$. Equation (7) is in reality a criterion of the unstable conditions of the circuit rather than Equation (5). That is, the minimum point on the resistance-voltage curve of Fig. 4 is a point at which instability will occur. It represents a condition in which the ratio of $$\frac{V_2}{R}$$

does not equal the ratio of $$\frac{V_1}{X_c}$$

It has been determined from Equation (10) and from the curves of Fig. 4 that instability will occur with a line voltage of 115 volts when the series resistance is of such a value that $V_1$ is 57 volts. If $I_L$ is differentiated in Equation (5) with respect to $V_1$, it will be found that $I_L$ is a maximum when $V_1$ is 50 and this value is entirely independent of the line voltage and magnitude of the series impedance. Thus it is determined that the maximum value of current $I_L$ does not indicate the point at which instability occurs for this phenomenon has been found to occur when $V_1$ is 57 volts. By inspection of the curve illustrated in Fig. 7 it will be observed that the point at which instability occurs is past the point of maximum current and part of the section AB is a stable condition. If the line voltage $V_L$ is 100 volts it has been found that instability will occur when $V_1$ is 61.5 volts, and when the line voltage $V_L$ is 95 the point of instability is found to occur when $V_1$ is 65 volts. However, for all these conditions of different values of $V_L$ the maximum current occurs when $V_1$ equals 50. The actual position of the point X at which instability occurs, therefore, moves along the lines AB of Fig. 6 depending upon the value of line voltage $V_L$. If $V_L$ is reduced beyond a certain limit the circuit will not even become unstable. This limit can be determined by taking a second derivative of Equation (7) or a first derivative of Equation (10). In the latter equation the value of $V_L$ is either a maximum or minimum when $2V_L^2$ is a maximum or minimum. Therefore, replace $2V_L$ in this equation by the symbol M. Then differentiating the resulting equation gives the following:

$$\frac{dM}{dV_1} = \frac{(V_1-50)3V_1^2 - V_1^3}{(V_1-50)^2} = 0$$

from which $$(V_1-50)^2 = 0$$

$$V_1 = 50$$

and $$(V_1-50)3V_1^2 - V_1^3 = 0; \quad V_1 = 0$$

$$(V_1-50) = \frac{V_1}{3}$$

$$\frac{2V_1}{3} = 50$$

$$V_1 = 75$$

The value of $2V_L^2$ is either a maximum or minimum when $V_1$ is 0, 50 or 75. The corresponding values of $V_L$ are tabulated below:

| $V_1$ | $V_L$ |
|---|---|
| 0 | 0 |
| 50 | Infinity |
| 75 | 92 |

This shows that the minimum line voltage that can exist and at the same time maintain the unstable property is 92 volts for the circuit chosen. If the line voltage is less than 92 volts the circuit or network will not experience a large change in voltage across any of its elements or branch circuits, when the series resistance is varied. From the results obtained by differentiating Equation (10) it is noted that in order to cause the circuit to become unstable at a maximum value of line current, that is, at the point A of Fig. 6, it would be necessary for the line voltage to be infinite.

Figure 9:
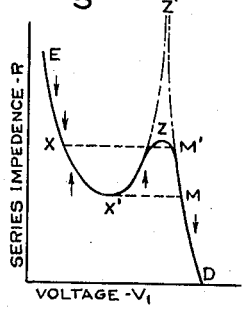

The phenomenon of instability which has been discussed in detail hereinbefore may be conveniently shown graphically as in Fig. 9 which illustrates a typical resistance-voltage $(R-V_1)$ curve. The curve shown partly dotted and designated E,X,X',Z',M',M,D is a curve representing the mathematical expression of the assumed theoretical circuit of Equation (7) with the point Z' at infinity. The curve, shown by a solid line throughout, and designated E,X,X',Z,M',M,D is a curve representing the actual conditions in a circuit where the equivalent resistance $R_e$ of the reactor and capacitor is not neglected. Beginning with a relatively high series resistance and gradually reducing it the voltage $V_1$ and the resistance will follow along the curve EX to X'. At a resistance corresponding to X' the voltage immediately jumps to the point M and proceeds along MD as the resistance is further decreased. It is to be noted, however, that if the point X' is merely approached and not actually attained and one then starts to increase the resistance the curve will be traced along the portion X', XE and not along X'ZM'. If one begins with a low value of resistance and gradually increases it the voltage will follow along DM to M' where it again jumps to the point X and continues along the curve XE as the resistance is further increased. As in the case of decreasing resistance, if one approaches but does not actually pass through the point M' and starts to decrease the resistance the curve will be retraced along the path M'MD. However, once the point M' is passed and operation is at point X any change in resistance will cause the circuit to operate on the curve E,X,X'.

It will thus be observed that with decreasing values of resistance that part of the curve between X' and M is unstable and cannot exist as a steady state condition. With decreasing values of resistance the point of instability occurs at X' which is the minimum portion of the curve. With increasing values of resistance, however, the curve shows the point M' differently located from the maximum point Z, because of the fact that under these conditions of higher values of $V_1$ there is a certain amount of distortion entering into the circuit which prevents the points Z and M' from coinciding. However with increasing values of resistance the instability point does occur somewhere near the maximum value Z of the curve. With this type of circuit there is no condition where the points will exist along that portion of the curve X'M' for either increasing or decreasing values of resistance. If one places in the circuit a set of instruments to measure this curve and begins with a relatively high value of resistance the curve E,X,X',M,D may be plotted. At the point D the series impedance R will have been reduced to zero. On increasing the values of R the curve Z,M,M'XE may be plotted.

An examination of the curve of Fig. 9 will reveal that the critical points X' and M' do not coincide and that the curve exhibits a loop which will be referred to hereinafter as a hysteresis loop.

In referring to the condition of the circuit some differentiation must be made regarding the portion on the curve to which reference is made. Hence the expression "stable state number 1" will refer to all portions along the curve EXX' of the $R-V_1$ curve. In other words, this expression refers to the state before instability occurs. The expression "stable state number 2" will refer to the portion along M'MD or that stable condition existing after the circuit has passed through an unstable period.

In general, in a circuit as shown in Fig. 1, any one of the quantities, such as the series impedance, the reactance of the capacitance or inductance in the parallel branch, the line voltage, or the line frequency, may be varied while the other quantities are fixed, except for their inherent non-linear characteristics, and the hysteresis effect previously described may be observed. The area within the hysteresis loop may be quite easily controlled by varying, for example, the series impedance. The two critical points X' and M' may very nearly coincide or they may be displaced by a large amount. The particular characteristics obtained from a non-linear circuit depend upon two factors; first, the relation between the volt-ampere curves of inductance and capacitance, and second, the relation of the series impedance to the capacitance and inductance unit.

In accordance with the present invention the conditions for instability require that the respective volt-ampere curves of the inductance and capacitance converge or intersect and that a particular relation must exist, as shown graphically in Fig. 9, between the impedance of the series branch and the impedance of the parallel branch for a particular value of applied voltage. It is not essential to the operation of the circuits embodying my invention that the inductance element should be saturated but a certain degree of saturation is preferable in order to obtain a sharper and more positive action at the transition points in the cycle of operation between a stable state and an unstable state. One characteristic feature of the circuit of the present invention is that during the transition from one stable state to another, the current to the parallel branch is a discontinuous function of the voltage across the parallel-branch and hence a definite value of current cannot exist for some specific values of voltage across some element of the circuit. In contradistinction to this characteristic feature of the unstable circuit, the stable circuit, having a similar arrangement of impedances and heretofore known, is characterized by the fact that the current is a continuous function of the voltage and there is uniquely determined one or more definite values of current for every value of voltage across some element of the circuit throughout the operating range of the circuit.

The effect of frequency on the characteristics obtained from a non-linear circuit may be predicted by considering the volt-ampere curves shown in Fig. 3. If the frequency is increased the value of current through the capacitance at any particular valued voltage $V_1$ will increase while the current through the reactor will tend to decrease. Thus the point of intersection of the two curves will occur at a higher value of the voltage $V_1$. Conversely, for reduced frequency the point of intersection occurs at a lower value of the voltage $V_1$. A change in the intersection of the two volt-ampere curves will change the equation of line current, that is, Equation (5), which in turn will effect Equation (7) and those following. The frequency therefore has a direct influence upon the critical values of X' and M'.

Various applications involving the characteristics of the parallel-type of non-linear circuit in which the phenomenon of instability is an important feature will now be described.

Figure 10:
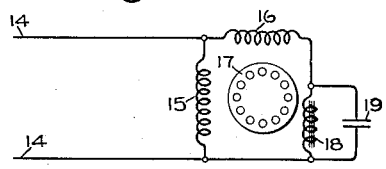

Referring to Fig. 10, alternating current supply conductors 14 are connected to energize a split phase motor comprising main stator windings 15, a starting winding 16, and a squirrel cage type of rotor 17. In series relation with the starting winding 16 I connect a parallel type of non-linear circuit comprising a non-linear inductance 18 connected in parallel relation with a capacitance 19.

It has been mentioned in the discussion of the fundamental circuit that in passing from stable state number 1 into stable state number 2, there may be a large change in phase relation between the line current and line voltage. Likewise there is a large change in phase relation between the voltage across the series impedance and line voltage.

In a split phase motor it is well known that if the flux produced by the starting winding lags that produced by the main winding, the motor will rotate in one direction, for example, clockwise. If, on the other hand, the flux produced by the starting winding leads that produced by the main winding the rotation will be counter-clockwise. Therefore, by inserting the non-linear circuit, as illustrated, in series with the starting winding a simple type of reversing motor is provided without contacts. Thus by simply changing the value of line voltage, the frequency, or by changing the value of an auxiliary resistor in the starting winding circuit, moving a plunger in or out of the inductance, or by changing the value of the capacitance, the motor may be made to reverse its direction of rotation. By holding all of the above variables fixed, except the line voltage, a system has been obtained wherein an increase of two volts in line voltage produces a change in rotation after which a decrease of two volts again caused reversal thereby returning to the original direction of rotation.

Figure 11:
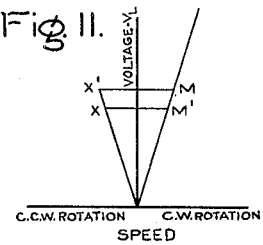

In Fig. 11 I have shown another curve containing a hysteresis loop in which line voltage $V_L$ as ordinates is plotted against speed and direction of rotation as abscissae. In order that this reversible type of motor may be better adapted for voltage regulation it is desirable to maintain the hysteresis loop as small as possible. The area of this loop may be varied at will. The width may be increased or decreased by changing the magnitude of the impedance in series with the parallel non-linear branch.

The split phase motor controlled by this type of non-linear circuit has many characteristics. For example, the motor can be made to reverse once for increasing voltage and thereafter regardless of the variation in line voltage will not reverse again until the line voltage has been removed entirely and re-applied when the original direction of rotation is established. Again, if the motor is allowed to operate without load it will oscillate, first in one direction, then in the other, because of the fact that the impedance of the starting winding changes as the speed of rotation changes. The number of revolutions taken in each direction depends upon the line voltage and at one particular value of line voltage the net resultant number of revolutions is zero. With voltages slightly above this value there is a net gain in the clockwise direction and if the voltage is increased further rotation in the counterclockwise direction ceases altogether, but it will continue to start and stop, the rotation always being in a clockwise direction. If the line voltage is still further increased, the rotation becomes continuous in the clockwise direction. With voltages lower than those mentioned above, the sequence is repeated in the counter-clockwise direction.

The fundamental characteristics of instability and the hysteresis loops in non-linear circuits may be utilized in the conversion of electrical energy into mechanical energy without contacts, brushes, commutators or slip rings and furthermore this energy may be converted directly into oscillatory or rotary motion.

Figure 12:
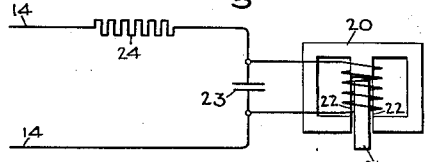

Referring to Fig. 12, a parallel type non-linear circuit is provided in which a reactor 20 fulfills the dual purpose of providing an inductance of the non-linear type and also acting as a solenoid for a plunger 21. The section 22 of the reactor is a saturated section illustrated as a single lamination of the core structure. A capacitor 23 is connected in parallel with the winding of reactor 20 and this non-linear branch circuit is connected in series with an impedance, shown as a resistance 24, to be energized from the alternating supply conductors 14.

Figure 13:
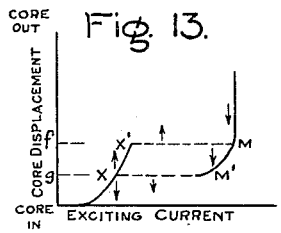

The operating cycle of this embodiment of my invention may be better understood by reference to Fig. 13 in which a curve is plotted between core displacement as ordinates and exciting current as abscissae. With constant values of line voltage $V_L$ and of impedance 24 the circuit will produce unstable characteristics as previously mentioned when the core is moved in or out of the solenoid. The arrows on the curve indicate the direction of movement of the core.

If the core is moving inward it will be noted that a greater flux is produced between the points $f$ and $g$ on the core displacement axis. That is, the attractive pull is unidirectional. In a physical embodiment of the arrangement illustrated in Fig. 12 the point $f$ on the core displacement axis of Fig. 13 corresponds to a point at which the core has entered the solenoid 50 per cent of its possible travel in an upward direction as viewed in the drawings and the point $g$ corresponds to a point at which the core has entered the solenoid approximately 5/6 or 83⅓ per cent of its possible travel in an upward direction as viewed in the drawings. If the core is removed by gravity, by a spring, or by some other external force beyond the point $f$ a continuously reciprocating motion is produced. The voltage across the inductance thus continually oscillates through the unstable period from stable state number 1 to stable state number 2 and back again. When the core is in the solenoid the voltage across the inductance is low and in stable state number 1. When the core is removed, stable state number 2 persists and a high voltage exists across the inductance. The consequent high value of the flux pulls the plunger in and the motion of the core changes the voltage to that corresponding to stable state number 1. A difference in flux exerted upon the plunger between stable state number 1 and 2 is accentuated by the fact that in stable state number 1 practically all of the flux passes through the saturated section 22 and practically none through the air gap to the movable core. In stable state number 2, however, the majority of the flux passes through the air gap and into the plunger because of the fact that the small section of iron bridging the air gap is saturated.

Figure 14:
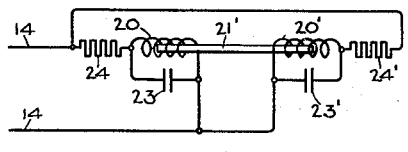

In Fig. 14 I have shown two similar reactors and parallel-connected capacitors in series relation with an impedance and indicated by the same numerals as were employed in Fig. 12 for the corresponding elements of one circuit and by primed numerals for the corresponding elements of the other circuit. By using a common core 21', a continuously reciprocating system is obtained with power delivered during each stroke. When the two reactors are connected in parallel the line current is practically sinusoidal and in phase with the line voltage. It remains constant during the reciprocating motion of the plunger because when the current in one reactor is low the current in the second reactor is high such that the sum of these two currents is at all times practically constant. Frequency affects the operation of the reciprocation to some extent in that it tends to change the period of oscillation of the plunger. However, the frequency may be varied over a wide range, for example, 20 cycles before the motion ceases. The system is also comparatively insensitive to line voltage which may be varied over a range of 100 percent without causing the reciprocating motion to cease. The actual area of the hysteresis loop shown in Fig. 13 is changed by a variation in line voltage or frequency but on account of the inertia of the plunger the actual stroke may extend over a considerable range, hence a considerable variation in area of the loop may be permissible without seriously affecting the mechanical operation.

Figure 15:
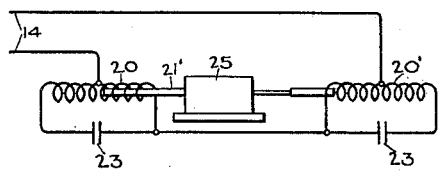

In Fig. 15 I have shown a modification of the arrangement illustrated in Fig. 14, in which the two reactors 20 and 20' are connected in series instead of in parallel. Each reactor and capacitor unit serves as a series impedance for the other, eliminating the additional series impedances 24 and 24' of Fig. 14. The two reactors 20 and 20' are coupled by a magnetic core 21' which is illustrated as operating a reciprocating type of compressor or pump 25. In this instance the capacitor 23 is connected across an extended winding of the reactor. This arrangement has the advantage of permitting the capacitor to be operated at its maximum voltage, thereby allowing its microfarad rating to be a minimum. The reactor performs a four-fold purpose. First, it serves as a non-linear reactor with a movable plunger which produces a sufficient change in reactance to produce a transfer between the two stable conditions. Second, it serves as a solenoid for converting the electrical energy into mechanical energy. Third, it serves as a transformer to raise the voltage on the capacitor. Fourth, it provides a means of obtaining a variable capacity reactance. This last mentioned feature may be better understood in light of the following explanation. When the plunger is in the solenoid there is a good magnetic path for the flux allowing only a slight leakage between the primary and secondary windings on the core. This gives approximately turn ratio voltage on the capacitor or in other words a voltage on the capacitor which is approximately equal to the voltage on the primary winding times the ratio of the secondary turns to the primary turns of the secondary and primary windings on the core. When the plunger is withdrawn, the large air gap causes a large leakage flux between the primary and secondary windings and the voltage on the capacitor is thereby greatly changed. In other words, when the plunger is "in" the unit acts as a low reactance transformer and with the plunger "out" it acts as a high reactance transformer.

The arangement shown in Fig. 15 has many peculiar characteristics in that it operates so differently from known compressor or pump systems. For example, after the unit pumps up to a certain pressure the system stalls and the power input is reduced to a small value, much less than the power input while the unit is in operation. If the power input, under the stalled condition, can be reduced to a reasonable value then the system can be maintained on the line continuously and would automatically regulate the pressure to some specific value. That is, when the pressure reaches a certain value, the machine would stall and after the pressure was reduced to some specific value it would automatically start up and repump to the original pressure. It will be obvious to those skilled in the art that this arrangement would be applicable for use in operating air compressors, water pumps, explosion-proof gasoline pumps, etc., inasmuch as there are absolutely no moving contacts or moving electrical parts.

Figure 16:
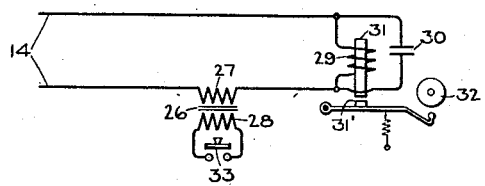

In Fig. 16 I have shown a circuit similar to the circuit shown in Fig. 14 for producing reciprocating motion. A transformer 26 having a primary winding 27 and a secondary winding 28 is connected with the primary winding 27 in series relation with a reactor 29 and a capacitor 30 connected in parallel therewith. The reactor is provided with a core 31 which actuates a pivoted armature 31', arranged to be operated to perform a reciprocating motion, which, as illustrated, operates the tapper of a bell 32. It will be obvious to those skilled in the art that the armature may actuate gongs, signals, flashers, etc. without departing from my invention in its broader aspects. The secondary winding 28 of transformer 26 is provided with a circuit closing means illustrated as a push-button type of switch 33. On open circuit the transformer 26 has such a high internal impedance that instability will not occur in the non-linear circuit branch. When the secondary winding is closed, however, the series impedance is reduced to such a value that reciprocating or vibrating mechanical motion is produced in accordance with the principles described in connection with the reciprocating motion circuit shown in Fig. 12.

Figure 17:
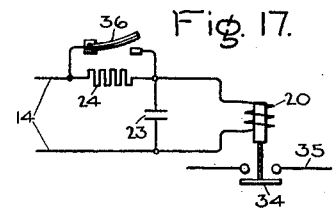

Aside from the applications of my invention which have been described attention is now directed to further applications involving circuit control and regulation. A circuit as shown in Fig. 12 may be a relay circuit, as shown in Fig. 17, in which the reactor may be used as the relay, that is, the plunger may carry the contacts 34 of a switch in a power circuit 35. When the plunger is properly dimensioned a continuous attractive pull may be maintained instead of the reciprocating action. In other words, the motion of the core would not cause the system to change from the stable state number 1 into stable state number 2 or vice versa, but would be controlled by a variation in line voltage or series impedance or some of the other factors which will produce the sudden change in voltage across the reactor and capacitor units. By means of an impedance varying device 36, illustrated as a thermal responsive switch operating across the resistance 24, the power circuit 35 may be opened and closed by action of the non-linear branch as explained hereinbefore, depending upon whether the switch is open or closed. The switch may be operated manually or in accordance with the condition to be regulated.

Figure 18:
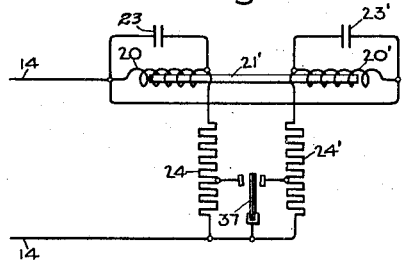

In Fig. 18 I have shown a temperature control circuit which is similar in circuit elements and arrangement thereof to the reciprocating motion device illustrated in Fig. 14. Corresponding elements are designated by similar reference numerals. When the arrangement is used without contacts the resistors 24 and 24' may comprise respectively two metals having practically equal and opposite temperature coefficients of resistance such as titanium and zinc. Tests of this circuit indicate that with a constant line voltage and frequency an increase of .4 percent in one resistor and a corresponding decrease in the other resistor will cause the plunger 21' to shift from one reactor to the other. Thus a temperature response system could be operated without a thermostat or contacts and would be relatively sensitive to temperature provided the line voltage and frequency remained constant. The sensitiveness to line voltage and frequency depends upon the percent change in the series impedance. If the arrangement as shown in Fig. 18 is provided with resistors of the same temperature coefficient of resistance and a thermal-responsive short-circuiting means 37 is provided for shorting out a portion of one resistor or the other, the effect of line voltage or frequency becomes negligible if the change in resistance is as much as 20 percent. A circuit of this type has shown satisfactory operation over a ten cycle change in frequency and a 20 volt variation in line voltage. It will be apparent that the arrangement shown in Fig. 18 could be economically used for furnace regulators in which the draft mechanism is directly connected to the core 21'.

In the developmental study of various embodiments of my invention, I have found that the embodiments of my invention illustrated in Figs. 12 to 18 involving reciprocating motion will start reciprocation without assistance other than by initiating the proper voltage, or current conditions, or both, in the supply conductors. This desirable feature is believed to result from surge conditions which make it highly improbable that an exact balance could be obtained in the circuit elements upon the application of voltage so that the movable core would lock in an intermediate or other position such that reciprocation would not be initiated without the application of an extraneous force.

While I have shown and described a number of embodiments of my invention, it will be obvious to those skilled in the art that various changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In combination, a capacitance element having a linear volt-ampere characteristic and an inductance element having a non-linear volt-ampere characteristic connected in parallel relation, and an impedance element connected in series relation with said parallel-connected elements, the electrical constants of each of said elements being of such a value and so correlated that when one of a plurality of variable conditions of the circuit is varied a relatively small amount the current to said parallel-connected elements is a discontinuous function of the voltage across said parallel-connected elements so that an abrupt and relatively large change in an electrical condition of one of said elements is effected.

2. In combination, a capacitance element having a linear volt-ampere characteristic and an inductance element having a non-linear volt-ampere characteristic connected in parallel relation, and an impedance element connected in series relation with said parallel-connected elements, the volt-ampere characteristics of said parallel-connected elements being so chosen with respect to the impedance of said series connected impedance element as to cause the total volt-ampere characteristic of the circuit of said combined elements to exhibit an unstable transition region between two stable regions during a change in an electrical condition or property of said circuit.

3. In combination, a capacitance element having a linear volt-ampere characteristic, an inductance element having a non-linear volt-ampere characteristic, said capacitance element and said inductance element being connected in parallel relation and having the respective volt-ampere characteristics thereof so correlated as to have the same value of current at a predetermined voltage across said parallel-connected elements, and an impedance element connected in series relation with said parallel-connected elements and so chosen with respect to the volt-ampere characteristics of said parallel-connected elements as to provide a minimum value of impedance below which the current to said parallel-connected elements is a discontinuous function of the voltage across said parallel-connected elements throughout a predetermined range of operation so that a sudden readjustment of voltage distribution takes place among the elements of the combined circuit for a predetermined voltage applied to said circuit.

4. In combination, a capacitance element having a linear volt-ampere characteristic, and an inductance element having a non-linear volt-ampere characteristic, said capacitance element and said inductance element being connected in parallel relation and having the respective volt-ampere characteristics thereof so correlated as to have the same value of current at a predetermined value of voltage thereacross intermediate the intended operating range of voltages of said circuit elements so that the current to said parallel-connected elements leads the voltage across said elements below said predetermined value of voltage and lags said voltage above said predetermined value, an impedance element connected in series relation with said parallel connected elements, said impedance element being arranged to provide a value of impedance below which the current to said parallel-connected elements is a discontinuous function of the voltage across said parallel-connected elements for a predetermined range of voltage including said predetermined value of voltage and means for effecting an abrupt and relatively large shift in the phase angle between the current and voltage of different component elements of the combined circuit elements at said predetermined value of voltage.

5. In combination, a capacitive element and an inductance element connected in parallel relation, the volt-ampere characteristics of said elements being linear and non-linear respectively and so chosen as to intersect at an intermediate value of voltage over the intended range of operation, and an impedance connected in series relation with said parallel-connected elements, said impedance being so chosen as to provide a minimum value below which the combined circuit exhibits an unstable phenomenon characterized by a current to said parallel-connected elements which is a discontinuous function of the voltage across said parallel-connected elements when the voltage across said parallel-connected elements is of a predetermined value.

6. An electroresponsive device provided with a winding, and a phase-modifying device having a current for a predetermined voltage applied to said electroresponsive device which is a discontinuous function of a voltage of said phase-modifying device for shifting the phase of the current abruptly in said winding relative to a voltage thereof at said predetermined value of applied voltage.

7. An electroresponsive device provided with a winding, and a compound reactive device comprising parallel-connected capacitor and saturable reactor elements connected in series relation with said winding and having an effective impedance relative to the impedance of said winding so that the current of said winding is a discontinuous function of the voltage across said compound reactive device at a predetermined value of voltage applied to said electroresponsive device for shifting the phase of the current abruptly in said winding relative to the voltage across said winding at said predetermined value of applied voltage.

8. An alternating-current dynamo-electric device comprising a primary member having an energizing winding, a secondary member, and a phase modifying device connected in circuit with said energizing winding and having a current at a predetermined value of voltage applied to said dynamo-electric device which is a discontinuous function of said applied voltage for reversing the phase of the current abruptly in said energizing winding as the voltage applied to said dynamo-electric device passes through said predetermined value.

9. An electroresponsive device provided with two windings for producing angularly displaced fluxes, and phase modifying means connected in circuit with one of said windings and having a current at a predetermined value of voltage applied to said device which is a discontinuous function of said applied voltage for causing in-phase currents to traverse said windings at a value of applied voltage differing from said predetermined value and for causing an abrupt change in the phase relation of the currents in the respective windings at said predetermined value of voltage.

10. An electroresponsive device provided with an excitation member, and a compound reactive device connected in circuit with said excitation member and having a current at a predetermined value of voltage thereacross which is a discontinuous function of said voltage so that said reactive device acts as a capacitance for a range of voltages below said predetermined voltage and abruptly changes in reactive character to act as an inductance for a range of voltages above said predetermined voltage.

11. In an electroresponsive device, a pair of cooperating windings, a parallel-type non-linear circuit connected in series relation with one of said windings and having a current to said circuit at a predetermined value of voltage thereacross which is a discontinuous function of said voltage, said non-linear circuit being so proportioned relative to the impedance of said one of said windings as to effect an abrupt change in the relative energizations of said windings at a predetermined value of a variable quantity of said device which establishes said discontinuity.

12. In an induction motive device, an inducing member comprising a pair of cooperating windings, a movable induced member, and a parallel-type non-linear circuit connected in series relation with one of said windings and exhibiting a current to said circuit at a predetermined voltage applied to said device which is a discontinuous function of said voltage so as to provide a reversal in phase angle of the flux produced by said one winding with respect to the flux produced by the other winding at said predetermined voltage for selectively controlling the direction of movement of said induced member in accordance with the voltage applied to said inducing member.

13. In combination, a capacitance element having a linear volt-ampere characteristic, an inductance element having a non-linear volt-ampere characteristic, said capacitance element and said inductance element being connected in parallel relation, a movable magnetic member for varying the inductance of said inductance element, and an impedance connected in series relation with said parallel connected elements.

14. Means for converting electrical energy into mechanical energy comprising, a capacitance element, an inductance element provided with a solenoid and a movable core, said capacitance element and said inductance element being connected in parallel relation, said capacitance element and said inductance element being so dimensioned that with a constant voltage applied to said parallel connected elements movement of said core into said solenoid causes a decrease in the voltage across said inductance and movement out of said solenoid causes an increase in the voltage across said inductance whereby said core is caused to reciprocate.

15. Means for converting electrical energy into mechanical energy comprising, a pair of parallel-type non-linear branch circuits each comprising a capacitance element and an inductance element having a solenoid connected in parallel relation, an impedance element connected in series relation with each of said branch circuits, said branch circuits and associated impedance elements being connected in parallel relation, and movable magnetic means arranged for relatively opposite reciprocating motion within the respective solenoids.

16. Means for converting electrical energy into mechanical energy comprising, a pair of parallel-type non-linear branch circuits each comprising a capacitance element and an inductance element having a solenoid connected in parallel relation, said branch circuits being connected in series relation, and movable magnetic means arranged for relatively opposite reciprocating motion in unison within the respective solenoids.

17. Means for converting electrical energy into mechanical energy comprising, a pair of non-linear branch circuits each comprising a capacitance element and an inductance element having a solenoid provided with end terminals and an intermediate terminal, each capacitance element being connected in parallel relation with its associated inductance element across the end terminals thereof, said branch circuits being connected in a series circuit including said intermediate terminals, and movable magnetic means arranged for relatively opposite reciprocating motion in unison within the respective solenoids.

18. In combination, a parallel-type non-linear branch circuit comprising a capacitance element and an inductance element connected in parallel relation, magnetic means actuated by said inductance element, and variable impedance means connected in circuit with said non-linear branch circuit for selectively changing the characteristics of said circuit so that abrupt changes in voltage across said inductance may be effected by movement of said magnetic means.

19. In combination, a parallel-type non-linear branch circuit comprising a capacitance element and an inductance element connected in parallel relation, a movable magnetic member actuated by said inductance element, an impedance connected in series relation with said non-linear branch circuit and correlated therewith so that a steady pull is exerted upon said magnetic member irrespective of its position to said inductance, and means for varying the total volt-ampere characteristic of the series connected elements to effect an abrupt change in the voltage across said inductance element.

20. In combination, a capacitance element having a linear volt-ampere characteristic, an inductance element having a non-linear volt-ampere characteristic, said capacitance element and said inductance element being connected in parallel relation, a movable magnetic member arranged for actuation by said inductance element, and a variable impedance element connected in series relation with said parallel connected elements for effecting a change in the position of said magnetic member.

21. In combination, a pair of parallel-type non-linear branch circuits each comprising a capacitance element and an inductance element having a solenoid connected in parallel relation with said capacitance, a variable impedance element connected in series relation with each branch circuit, said branch circuits and associated impedance elements being connected in parallel relation, and movable magnetic means arranged for movement into one of said solenoids and out of the other, or vice versa, in accordance with the relative value of said impedance elements.

22. In combination, a pair of parallel-type non-linear branch circuits each comprising a capacitance element and an inductance element having a solenoid connected in parallel relation with said capacitance, an impedance element connected in series relation with each branch circuit, said branch circuits and associated impedance elements being connected in parallel relation, movable magnetic means arranged for movement by the respective solenoids, and means for varying said impedance means for selectively determining the direction of movement of said magnetic means.

23. An electric system comprising a source of alternating current, a capacitance element and an inductance element connected in parallel relation for energization from said source, the volt-ampere characteristics of said elements being linear and non-linear respectively and so chosen as to converge over the intended range of operation of said system, an impedance connected in series relation with said parallel-connected elements, said impedance element being arranged to provide a minimum value of impedance below which the system exhibits an unstable current-voltage condition of operation during which the current to said parallel-connected elements is a discontinuous function of the voltage across said parallel-connected elements when the voltage of said source is of a predetermined value.

24. In an electric circuit, the combination of a source of alternating current, a capacitance element, an inductance element having a non-linear volt-ampere characteristic and connected in parallel relation with said capacitance element for energization from said source, an impedance element connected in series relation with said parallel-connected elements, the respective volt-ampere characteristics of said parallel-connected elements being arranged to be converging within the intended range of operation of said circuit and said impedance providing such a value for a given value of the voltage of said source within the intended range of operation of said circuit as to cause the total volt-ampere characteristic of said circuit to exhibit an unstable transition region between two stable regions, and means for effecting a change in an electrical condition of one of the elements of said electric circuit for causing operation thereof through said unstable transition region.

25. An electric system comprising a source of alternating current, a capacitance element, an inductance element having a non-linear volt-ampere characteristic, said capacitance element and said inductance element being connected in parallel relation for energization from said source and having the respective volt-ampere characteristics thereof so correlated as to have the same value of current at a predetermined voltage within the intended range of operation of said system, an impedance element connected in series relation with said parallel-connected elements and having a value with respect to the equivalent impedance of said parallel-connected elements as to provide a minimum value of impedance below which for a predetermined region of operation the current to said parallel-connected elements is a discontinuous function of the voltage across said parallel-connected elements so that a sudden readjustment of voltage takes place between said impedance element and said parallel-connected elements, and means for effecting a change in said system for causing said readjustment of voltage.

26. An electric system comprising a source of alternating current, a capacitance element and an inductance element connected in parallel relation for energization from said source, the volt-ampere characteristics of said elements being linear and non-linear respectively and so correlated as to cause the current to said parallel-connected elements to lead the voltage across said elements below a predetermined operating voltage of said source and to lag said voltage above said predetermined value, an impedance connected in series relation with said parallel-connected elements, said impedance element being arranged to provide a value of impedance element being arranged to provide a value of impedance below which the system exhibits at said predetermined operating voltage a current to said parallel-connected elements which is a discontinuous function of the voltage across said parallel-connected elements so that an abrupt and relatively large shift from lead to lag or vice versa in said phase angle of said current is effected.

27. An electric system comprising a source of alternating current, a capacitance element, an inductance element having a non-linear volt-ampere characteristic and connected in parallel relation with said capacitance element for energization from said source, the volt-ampere characteristics of said parallel-connected elements being so correlated as to cause the current to said parallel-connected elements to lead the voltage across said elements below a predetermined operating voltage of said source and to lag said voltage above said predetermined value, an impedance element connected in series relation with said parallel-connected elements, and means operative to change an electrical condition of one of the elements of said system for causing over a predetermined range of operating voltages including said predetermined operating voltage an unstable transition period characterized by a current to said parallel-connected elements which is a discontinuous function of the voltage across said elements so that an abrupt and relatively large shift from lead to lag or vice versa is effected in said phase angle of the current to said parallel-connected elements.

CLAUDE M. SUMMERS.

CERTIFICATE OF CORRECTION.

Patent No. 2,040,763. May 12, 1936.

CLAUDE M. SUMMERS.

It is hereby certified that error appears in the printed specification of the above numbered patent requiring correction as follows: Page 2, second column, line 30, for the word "value" read values; page 10, second column, lines 6, 7 and 8, claim 26, strike out "element being arranged to provide a value of impedance"; and that the said Letters Patent should be read with these corrections therein that the same may conform to the record of the case in the Patent Office.

Signed and sealed this 25th day of August, A. D. 1936.

Leslie Frazer (Seal) Acting Commissioner of Patents.